United States Patent
Tang et al.

(10) Patent No.: US 11,338,853 B2
(45) Date of Patent: May 24, 2022

(54) METHODS, DEVICES, AND MEDIA FOR AUTONOMOUSLY DRIVING VEHICLE

(71) Applicant: BAIDU ONLINE NETWORK TECHNOLOGY (BEIJING) CO., LTD., Beijing (CN)

(72) Inventors: Ke Tang, Beijing (CN); Jiayong Huang, Beijing (CN); Xiapeng Peng, Beijing (CN); Wenchuang Qin, Beijing (CN); Qiyang Shao, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 116 days.

(21) Appl. No.: 16/909,610

(22) Filed: Jun. 23, 2020

(65) Prior Publication Data
US 2021/0009203 A1 Jan. 14, 2021

(30) Foreign Application Priority Data
Jul. 10, 2019 (CN) .......................... 201910620964.9

(51) Int. Cl.
*B62D 15/02* (2006.01)
*B60W 60/00* (2020.01)
*G06V 20/56* (2022.01)

(52) U.S. Cl.
CPC ......... *B62D 15/021* (2013.01); *B60W 60/001* (2020.02); *B62D 15/025* (2013.01);
(Continued)

(58) Field of Classification Search
CPC .... B62D 15/02; B62D 15/021; B62D 15/025; B60W 60/00; G05D 1/02
See application file for complete search history.

(56) References Cited

U.S. PATENT DOCUMENTS

| | | | |
|---|---|---|---|
| 2010/0145575 A1* | 6/2010 | Switkes | B62D 15/025 701/41 |
| 2012/0283913 A1* | 11/2012 | Lee | B62D 15/025 701/41 |

(Continued)

FOREIGN PATENT DOCUMENTS

| | | |
|---|---|---|
| CN | 102495631 A | 6/2012 |
| CN | 102741109 A | 10/2012 |

(Continued)

OTHER PUBLICATIONS

European Patent Application No. 20165984.4 extended Search and Opinion dated Sep. 15, 2020, 8 pages.

(Continued)

*Primary Examiner* — Tan Q Nguyen
(74) *Attorney, Agent, or Firm* — Lathrop GPM LLP (57) ABSTRACT

The present disclosure provides a method and an apparatus for autonomously driving a vehicle. The method includes: recognizing a centerline of a lane on which a current vehicle is driving; acquiring a lateral distance between the current vehicle and the centerline of the lane, and a real-time speed and a real-time motion curvature of the current vehicle; calculating the lateral distance, the real-time speed, and the real-time motion curvature, based on a preset first spiral line equation, to acquire parameters of a reference spiral line; calculating the parameters, the real-time speed, and the real-time motion curvature, based on a preset second spiral line equation, to acquire a current spiral line; and determining an steering angle instruction of a steering wheel based on a first curvature of the current spiral line; and controlling the current vehicle for autonomous driving based on the steering angle instruction.

12 Claims, 7 Drawing Sheets

(52) U.S. Cl.
CPC ....... *G06V 20/588* (2022.01); *B60W 2520/14* (2013.01); *B60W 2552/30* (2020.02); *B60W 2710/20* (2013.01)

(56) References Cited

U.S. PATENT DOCUMENTS

| | | | |
|---|---|---|---|
| 2013/0006473 | A1 | 1/2013 | Buerkle et al. |
| 2013/0173115 | A1 | 7/2013 | Gunia et al. |
| 2014/0257640 | A1* | 9/2014 | Mitsumoto ......... B60W 40/101 701/41 |
| 2016/0052547 | A1* | 2/2016 | Kashiwai ............ B60W 40/076 701/41 |
| 2016/0107682 | A1* | 4/2016 | Tan .......................... B62D 6/00 701/41 |
| 2016/0327959 | A1 | 11/2016 | Brown et al. |
| 2017/0202131 | A1 | 7/2017 | Bunderson et al. |
| 2017/0232973 | A1* | 8/2017 | Otake ................... B60W 50/14 701/43 |
| 2017/0247032 | A1* | 8/2017 | Lee ....................... B62D 15/025 |
| 2017/0364083 | A1 | 12/2017 | Yang et al. |
| 2018/0043934 | A1* | 2/2018 | Okawa ................. G05D 1/0246 |
| 2021/0155289 | A1* | 5/2021 | Nilsson ................. B62D 13/00 |

FOREIGN PATENT DOCUMENTS

| | | |
|---|---|---|
| CN | 103183028 A | 7/2013 |
| CN | 104615889 A | 5/2015 |
| CN | 106114507 A | 11/2016 |
| CN | 107054459 A | 8/2017 |
| CN | 107618503 A | 1/2018 |
| CN | 107817790 A | 3/2018 |
| CN | 108459588 A | 8/2018 |
| CN | 108981730 A | 12/2018 |
| CN | 109733395 A | 5/2019 |
| CN | 109835338 A | 6/2019 |
| EP | 2168806 A2 | 3/2010 |
| EP | 2252861 A2 | 11/2010 |
| JP | 2011183995 A | 9/2011 |
| JP | 2019036302 A | 3/2019 |
| WO | WO 2017089118 A1 | 6/2017 |
| WO | WO 2017180504 A1 | 10/2017 |

OTHER PUBLICATIONS

Chinese Patent Application No. 201910620964.9 Office Action dated Nov. 3, 2021, 7 pages.

Chinese Patent Application No. 201910620964.9 English translation of Office Action dated Nov. 3, 2021, 5 pages.

Suzhe, Y,. Thesis "Study on Lane Keeping H∞ Robust Control of Autonomous Vehicles", 2018; 70 pages.

Pang, J., Dissertation "Research on intelligent vehicle trajectory planning based on comprehensive information perception" 2018, 103 pages.

Kim, W. et al. "Vehicle Path Prediction Using Yaw Acceleration for Adaptive Cruise Control" IEEE Transactions on Intelligent Transportation Systems, 2018, 12 pages.

* cited by examiner

METHODS, DEVICES, AND MEDIA FOR AUTONOMOUSLY DRIVING VEHICLE

CROSS-REFERENCE TO RELATED APPLICATION

This application claims a priority to and benefits of Chinese Patent Application No. 201910620964.9 filed with the China National Intellectual Property Administration on Jul. 10, 2019, the entire content of which is incorporated herein by reference.

FIELD

The present disclosure relates to the field of vehicle technologies, and more particularly, to a method, a device, and an computer-readable storage medium for autonomously driving a vehicle.

BACKGROUND

Self-driving vehicles integrate many technologies such as autonomous control, architecture, artificial intelligence, and visual computing. They are the highly-developed product of computer science, pattern recognition, and intelligent control technologies. The vehicle control system is a necessary link for autonomous driving as it controls the vehicle to follow a desired path. The vehicle control system may include the longitudinal motion control and the lateral motion control, in which the longitudinal motion control may control acceleration and deceleration of the vehicle, and the lateral motion control may control steering, lane changing, and lane keeping of the vehicle. The lateral motion control is significant to the entire autonomous driving system as straight-line driving, steering and lane changing of the vehicle are inseparable from the lateral motion control.

In the related art, the lateral motion control is realized based on an optimization method. However, such a control method needs a large amount of calculation and thus requires high computing performance of an autonomous driving platform. Most existing platforms will show defects such as insufficient computing performance and low control output frequency, resulting in unstable control.

SUMMARY

Embodiments of a first aspect of the present disclosure provide a method for autonomously driving a vehicle, including: recognizing a centerline of a lane on which a current vehicle is driving; acquiring a lateral distance between the current vehicle and the centerline of the lane, and a real-time speed and a real-time motion curvature of the current vehicle; calculating the lateral distance, the real-time speed, and the real-time motion curvature, based on a preset first spiral line equation, to acquire parameters of a reference spiral line; calculating the parameters, the real-time speed, and the real-time motion curvature, based on a preset second spiral line equation, to acquire a current spiral line; and determining a steering angle instruction of a steering wheel based on a first curvature of the current spiral line; and driving the current vehicle based on the steering angle instruction.

Embodiments of a second aspect of the present disclosure provide a computer device, including a processor and a storage device. The processor is configured to run, by reading an executable program code stored in the storage device, a program corresponding to the executable program code, so as to implement the method for autonomously driving the vehicle according to the embodiments of the first aspect.

Embodiments of a third aspect of the present disclosure provide a computer-readable storage medium having a computer program stored thereon. When the computer program is executed by a processor, the method for autonomously driving the vehicle according to the embodiments of the first aspect is implemented.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings.

DETAILED DESCRIPTION

Descriptions will now be made in detail to embodiments, examples of which are illustrated in the accompanying drawings. The same or similar elements and the elements having same or similar functions are denoted by like reference numerals throughout the descriptions. The embodiments described herein with reference to the drawings are explanatory, illustrative, and used to generally understand the present disclosure. The embodiments shall not be construed to limit the present disclosure.

A method and an apparatus for autonomously driving a vehicle are described below with reference to the accompanying drawings.

In order to achieve the stable and high-efficiency lateral motion control of autonomous driving, the present disclosure provides a new lateral motion control method for the autonomous driving system. With instructions obtained by the new lateral motion control method, a vehicle may smoothly realize lateral motions such as centerline following laterally, making a turn, and lane changing. Compared with control methods in the related art, the present disclosure, which flexibly utilizes the principle of the spiral line, presents a clear physical relationship, and outputs continuous and satisfying curvature instructions, so that motion sensing of lateral autonomous driving may be greatly improved. In addition, instructions given by the present disclosure based on a spiral line relationship may greatly reduce the amount of computation, mitigate the dependence of an algorithm on a vehicle model, and achieve low cost and high universality. The present disclosure directly obtains spiral lines at other speeds and curvature variations with an eigen spiral line, thereby effectively simplifying calculation logic of the spiral lines, shortening system computation period, improving the efficiency of the control algorithm, reducing the occupation of system resources, mitigating reliance on a high-performance platform, and lowering the costs of mass production.

Figure 1:
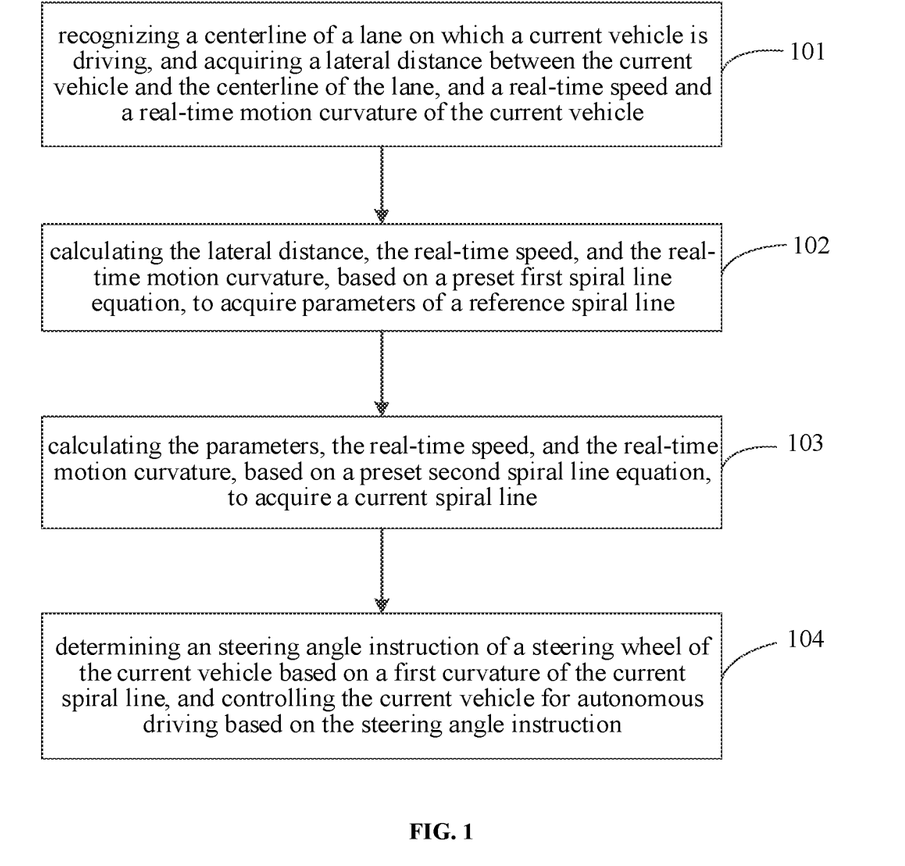
FIG. 1 is a flowchart of a method for autonomously driving a vehicle according to an embodiment of the present disclosure.

FIG. 1 is a flowchart of a method for autonomously driving a vehicle according to an embodiment of the present disclosure. As shown in FIG. 1, the method includes the following.

At block 101, a centerline of a lane on which a current vehicle is driving is recognized, and a lateral distance between the current vehicle and the centerline of the lane, and a real-time speed and a real-time motion curvature of the current vehicle, are acquired.

Figure 2:
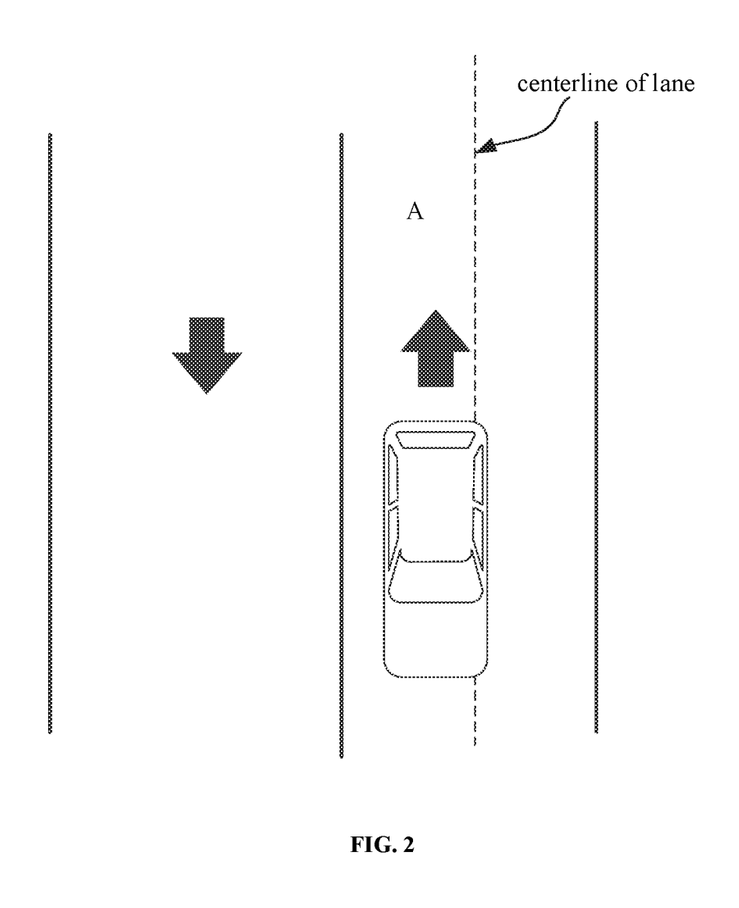
FIG. 2 is a schematic diagram of a centerline of a lane according to an embodiment of the present disclosure.

It should be understood that the centerline of the lane is a centerline of a lane on which the vehicle is currently driving. For example, as shown in FIG. 2, the current vehicle is driving on lane A, and the centerline of lane A is the centerline of the lane. In an embodiment of the present disclosure, a picture of a lane where the current vehicle is driving may be obtained based on a vehicle-mounted camera or communication with the satellite. The center position of the lane in the picture of the lane is recognized as the position of the centerline of the lane based on an image recognition algorithm, for example, edge positions of the lane are recognized based on the image recognition algorithm, and then the centerline of the lane is determined based on edge positions on both sides of the lane.

Figure 3:
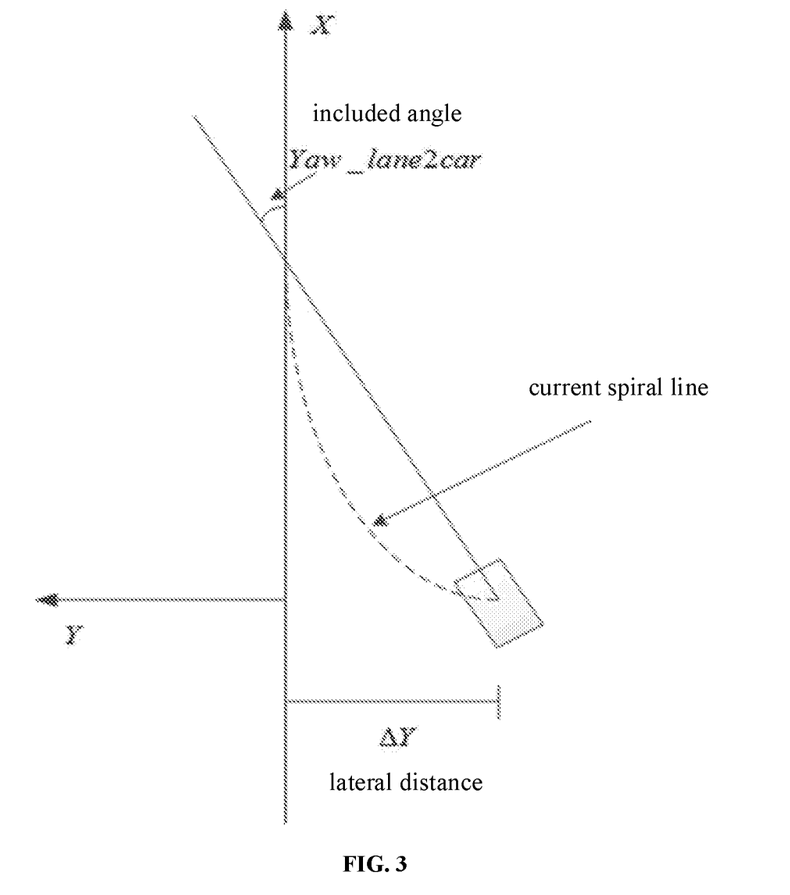
FIG. 3 is a schematic diagram of an application scenario of a method for autonomously driving a vehicle according to an embodiment of the present disclosure.

In detail, a spiral line between the current vehicle and the centerline of the lane is determined by using the centerline of the lane as a reference, so as to improve accuracy and motion sensing of vehicle control. In this embodiment, in order to obtain the spiral line between the current vehicle and the centerline of the lane, the lateral distance between the current vehicle and the centerline of the lane may be obtained. To avoid the influence of a posture of the vehicle on an acquisition of the lateral distance, as shown in FIG. 3, the lateral distance may be a lateral distance between the center of the vehicle and the centerline of the lane. The real-time speed and real-time motion curvature of the current vehicle may be obtained based on the communication with CAN (Controller Area Network) and IMU (Inertial measurement unit) of the vehicle. In the embodiment of the present disclosure, a physical relationship between the spiral line and the previously-discovered lateral distance, the real-time speed and the real-time motion curvature of the current vehicle is acquired to obtain the current spiral of the current vehicle.

At block 102, the lateral distance, the real-time speed, and the real-time motion curvature are calculated based on a preset first spiral line equation to acquire parameters of a reference spiral line.

At block 103, the parameters, the real-time speed, and the real-time motion curvature are calculated based on a preset second spiral line equation to acquire a current spiral line.

It may be understood that several reference spiral line equations are established in advance. In the present disclosure, based on real-time parameters such as the real-time speed of the current vehicle, parameters of the reference spiral line equation corresponding to the real-time parameters are determined, so as to determine the current spiral line corresponding to the current vehicle based on a physical corresponding relationship found between the real-time parameters such as real-time speed and the reference spiral line.

In detail, the lateral distance, the real-time speed, and the real-time motion curvature are calculated based on the preset first spiral line equation to acquire the parameters of the reference spiral line. As a possible implementation, the first spiral line equation is the following equation (1):

$$\Delta Y = Y_R \cdot \sqrt{\frac{V \cdot A\_Cur_R}{V_R \cdot A\_Cur}} \qquad \text{Equation (1)}$$

where, $\Delta Y$ represents the lateral distance, V represents the real-time speed, A_Cur represents a curvature variation that is obtained by deriving the real-time motion curvature, and $V_R$, $Y_R$, and $A\_Cur_R$ are parameters of the reference spiral line. Since the relationship among $V_R$, $Y_R$ and $A\_Cur_R$ may be obtained from the corresponding reference spiral line equation, $V_R$, $Y_R$, and $A\_Cur_R$ may be solved.

Figure 4:
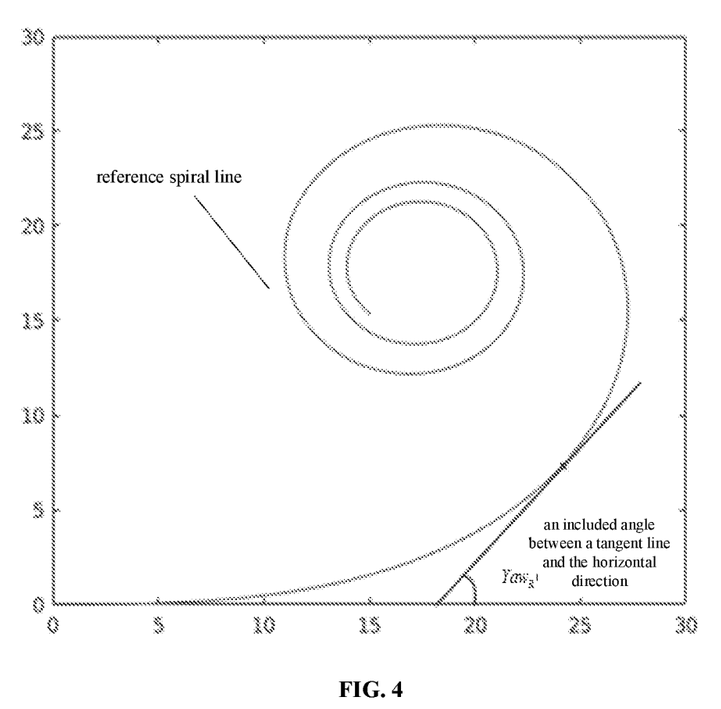
FIG. 4 is a schematic diagram of a reference spiral line according to an embodiment of the present disclosure.

In detail, when the reference spiral line is shown in FIG. 4, and an included angle between a tangent line on the reference spiral line and the horizontal direction is denoted as $Yaw_R(t)$, an equation of a curvature variation on the reference spiral line is obtained as equation (2):

$$Cur_R(t) = A\_Cur_R \times t \qquad \text{Equation (2).}$$

In equation (2), $Cur_R(t)$ is a reference curvature and $A\_Cur_R$ is a curvature variation.

According to equation (3), a corresponding relationship among the included angle between the tangent line on the reference spiral line and the horizontal direction, the reference curvature and the reference speed may be obtained, where the equation (3) is:

$$Yaw_R(t) = \int_0^t V_R \cdot Cur_R(t) dt \qquad \text{Equation (3)}$$

It integrates equation (3) to get equation (4):

$$Yaw_R(t) = A\_Cur_R \cdot V_R \cdot \frac{t^2}{2} \qquad \text{Equation (4)}$$

Furthermore, according to an integral of a variation of the included angle, a corresponding relationship between the distance and the included angle may be obtained, where the corresponding relationship may be represented by equations (5) and (6):

$$X_R(t) = \int_0^t V_R \cdot \cos(Yaw_R(t)) dt \qquad \text{Equation (5)}$$

$$Y_R(t) = \int_0^t V_R \cdot \sin(Yaw_R(t)) dt \qquad \text{Equation (6)}$$

Referring to FIG. 4, a coordinate system is set on the reference lane line. The X axis is along the tangent direction of the reference lane line, and the forward direction is taken as positive. The Y axis is perpendicular to the tangent line, and the left direction is taken as positive. $X_R(t)$ is a distance of the reference spiral line in the horizontal direction, and $Y_R(t)$ is a distance of the reference spiral line in the vertical direction. Furthermore, by substituting equations (5) and (6) into equation (4) to calculate the Fresnel integral, equation 7 may be derived.

$$X_R(t) = \int V_R \cdot \cos\left(A\_Cur_R \cdot V_R \cdot \frac{t^2}{2}\right) dt$$

$$Y_R(t) = \int V_R \cdot \sin\left(A\_Cur_R \cdot V_R \cdot \frac{t^2}{2}\right) dt \quad \text{Equation (7)}$$

It should be understood that, based on the reference spiral line equations expressed by equations (2) to (7), the corresponding relationship among $V_R$, $Y_R$ and $A\_Cur_R$ may be obtained, and further, parameter values of $V_R$, $Y_R$ and $A\_Cur_R$ may be obtained.

Further, after obtaining the parameters of the reference spiral line, the parameters, the real-time speed, and the real-time motion curvature are calculated based on the preset second spiral line equation to obtain the current spiral line, that is, the spiral line that matches real-time running parameters of the current vehicle may be determined based on a pre-established physical corresponding relationship. As a possible implementation manner, the second spiral line equation may be expressed by the following equation (8):

$$\text{Curvatrue} = Cur_R \cdot \sqrt{\frac{V_R \cdot A\_Cur}{V \cdot A\_Cur_R}} \quad \text{Equation (8)}$$

In equation (8), Curvature represents the current spiral line, $Cur_R$ represents a curvature of the reference spiral line, $A\_Cur_R$ represents a curvature variation that is obtained by deriving the curvature of the reference spiral line, $V_R$ represents a reference speed, V represents the real-time speed, and A_Cur represents the curvature variation that is obtained by deriving the real-time motion curvature.

After obtaining the parameters, such as $A\_Cur_R$ and $V_R$, of the reference spiral line, the current spiral line may be obtained based on the second spiral line equation.

At block 104, a steering angle instruction of a steering wheel is determined based on a first curvature of the current spiral line, and the current vehicle is controlled for autonomous driving based on the steering angle instruction.

In detail, after obtaining the current spiral line, the steering angle instruction of the steering wheel is determined based on the first curvature of the current spiral line, and the current vehicle is controlled for autonomous driving based on the steering angle instruction. Consequently, the current vehicle moves along the real-time spiral line with the centerline of the lane, and may be smoothly controlled to realize lateral motions such as centerline following laterally, making a turn and lane changing.

Of course, when a vehicle is in motion, as shown in FIG. 3, an included angle, Yaw_lane2car, will be generated between the direction of the vehicle body and the centerline of the lane. Therefore, in order to compensate for this included angle, a corresponding second curvature is obtained based on the included angle.

Figure 5:
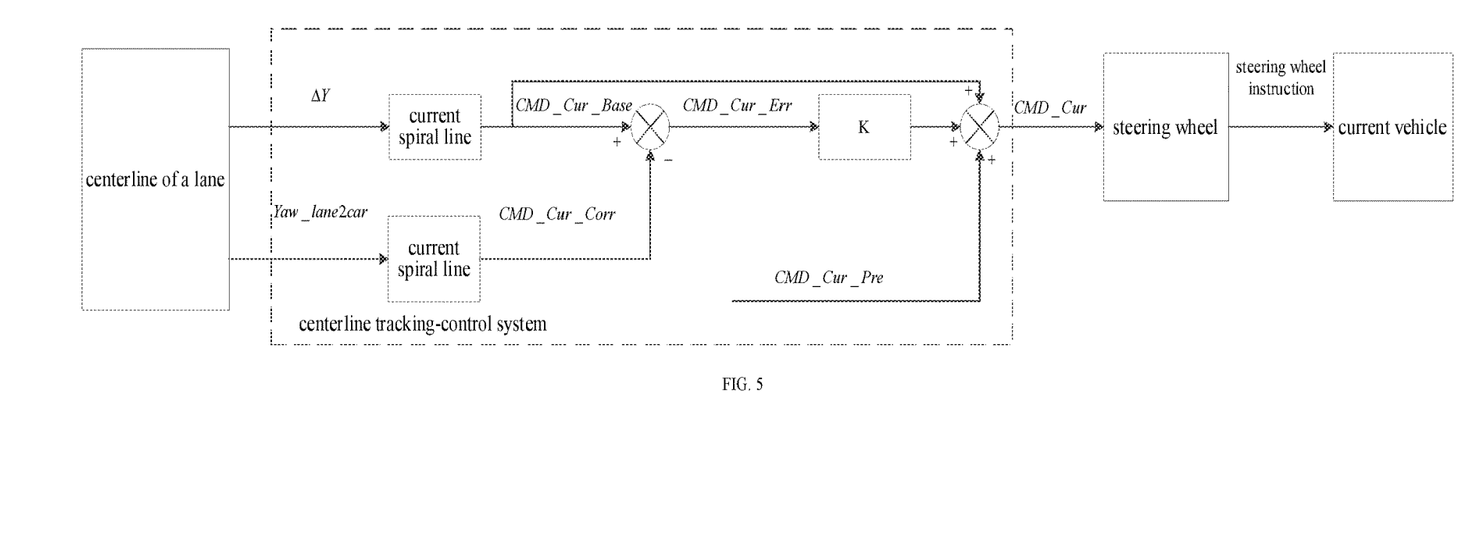
FIG. 5 is a schematic diagram of a method for autonomously driving a vehicle according to an embodiment of the present disclosure.

In detail, the included angle between the current vehicle and the centerline of the lane may be obtained. For example, the included angle between the current vehicle and the centerline of the lane may be obtained based on image recognition, sensing of an infrared sensor, etc., and then the second curvature may be obtained based on the included angle and the current spiral line. The second curvature is a curvature of the vehicle while it is in motion. That is, the second curvature of the current spiral line is obtained with another parameter. It is determined whether a difference between the first curvature and the second curvature is within a preset range, such as whether the first curvature and the second curvature are equal. For example, as shown in FIG. 5, the first curvature is CMD_Cur_base, the second curvature is CMD_Cur_Corr, and the difference, CMD_Cur_Err, between the first curvature and the second curvature is obtained through CMD_Cur_Err=CMD_Cur_base−CMD_Cur_Corr. In the present disclosure, CMD_Cur_Err is used to determine whether the current vehicle is moving according to the spiral line under the control of the instruction CMD_Cur_base. When CMD_Cur_Err is 0, it is determined that the current vehicle moves along the current spiral line. When CMD_Cur_Err is not within the preset range, for example, when CMD_Cur_Err is not 0, the first curvature is corrected based on a preset correction strategy. That is, it is considered that the curvature determined based on the real-time speed does not really follow the lane line, so that the first curvature is corrected, for example, a deviation is corrected based on an adjustable parameter K.

In addition, the curvature obtained in the above embodiment is actually obtained based on an assumption that the current vehicle is parallel to the centerline of the lane and has no yaw rate. That is, before controlling a steering wheel angle of the current vehicle based on the steering angle instruction to realize autonomous driving of the current vehicle, it is determined whether the yaw rate of the current vehicle is zero, and in response to the yaw rate being not zero, the steering angle instruction is corrected based on the real-time motion curvature.

In an embodiment of the present disclosure, in order to conform to the actual physical scene, with continued reference to FIG. 5, a curvature of a current motion trajectory of the vehicle body is added to the control system as a feedforward value, where the curvature of the current motion trajectory may be expressed as CMD_Cur_Pre. Therefore, the final curvature instruction CMD_Cur is: CMD_Cur=CMD_Cur_base+k*CMD_Cur_Err+CMD_Cur_Pre, where CMD_Cur_base is the first curvature and CMD_Cur_Err is the difference between the first curvature and the second curvature. By inputting the final curvature instruction to a steering wheel control system, the steering angle instruction of the steering wheel is obtained to control the vehicle, so as to control the vehicle to track the centerline of the lane.

Therefore, the present disclosure uses the spiral line equation obtained from a deviation of a yaw angle to correct the curvature instruction on the spiral line obtained from a lateral deviation, thereby effectively improving the lateral motion control accuracy of the vehicle and controlling the vehicle to strictly execute lateral motions based on a trajectory of the spiral line.

In summary, with the method for autonomously driving the vehicle according to the embodiment of the present disclosure, autonomous driving control based on the spiral line may ensure motion sensing of autonomous driving. In addition, the spiral line corresponding to the driving of the current vehicle may be directly determined based on predetermined equations, that is, spiral lines at other speeds and curvature variations may be obtained directly with the reference spiral line, thereby effectively simplifying calculation logic of the spiral lines, shortening system computation period, improving the efficiency of the control algorithm, reducing the occupation of system resources, mitigating reliance on a high-performance platform, and lowering the costs of mass production, such that the control accuracy is guaranteed while the amount of computation is reduced.

Figure 6:
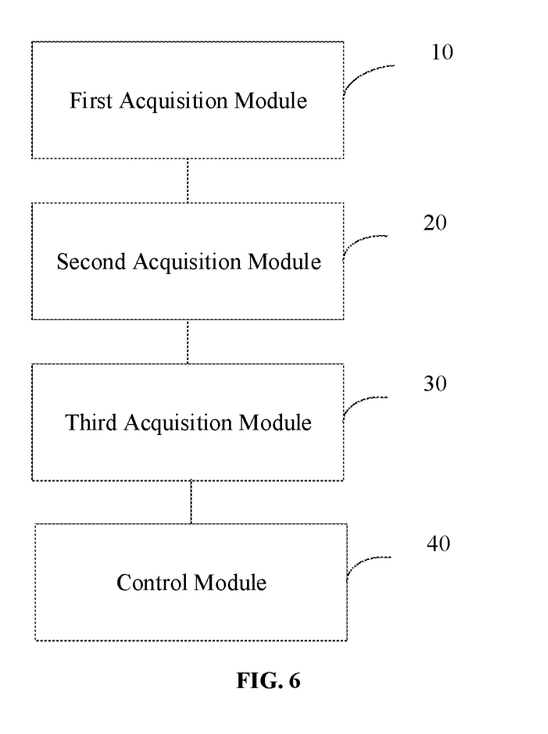
FIG. 6 is a schematic structural diagram of an apparatus for autonomously driving a vehicle according to an embodiment of the present disclosure.

To implement the above embodiment, the present disclosure further provides an apparatus for autonomously driving a vehicle. FIG. 6 is a block diagram of an apparatus for autonomously driving a vehicle according to an embodiment of the present disclosure. As shown in FIG. 6, the apparatus for autonomously driving a vehicle includes: a first acquisition module 10, a second acquisition module 20, a third acquisition module 30 and a control module 40.

The first acquisition module 10 is configured to recognize a centerline of a lane on which a current vehicle is driving, and acquire a lateral distance between the current vehicle and the centerline of the lane, and a real-time speed and a real-time motion curvature of the current vehicle.

The second acquisition module 20 is configured to calculate the lateral distance, the real-time speed, and the real-time motion curvature, based on a preset first spiral line equation, to acquire parameters of a reference spiral line.

The third acquisition module 30 is configured to calculate the parameters, the real-time speed, and the real-time motion curvature, based on a preset second spiral line equation, to acquire a current spiral line.

The control module 40 is configured to determine a steering angle instruction of a steering wheel of the current vehicle based on a first curvature of the current spiral line, and control the current vehicle for autonomous driving based on the steering angle instruction.

Figure 7:
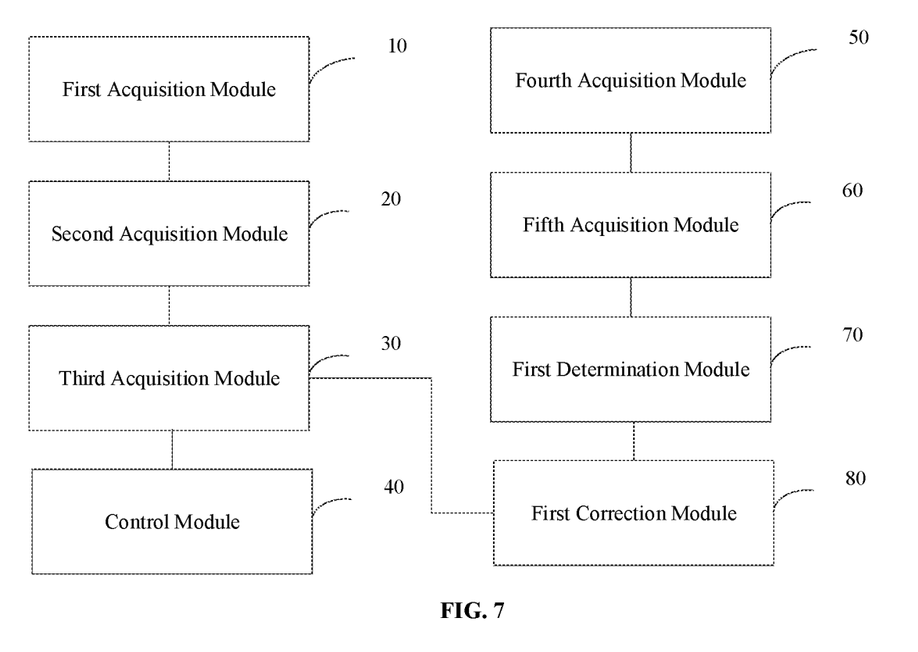
FIG. 7 is a block diagram of an apparatus for autonomously driving a vehicle according to another embodiment of the present disclosure.

In an embodiment of the present disclosure, as shown in FIG. 7 and on the basis of FIG. 6, the apparatus further includes: a fourth acquisition module 50, a fifth acquisition module 60, a first determination module 70, and a first correction module 80.

The fourth acquisition module 50 is configured to acquire an included angle between the current vehicle and the centerline of the lane.

The fifth acquisition module 60 is configured to acquire a second curvature based on the included angle and the current spiral line.

The first determination module 70 is configured to determine whether a difference between the first curvature and the second curvature is within a preset range.

The first correction module 80 is configured to, in response to the difference being not within the preset range, correct the first curvature based on a preset correction strategy.

Figure 8:
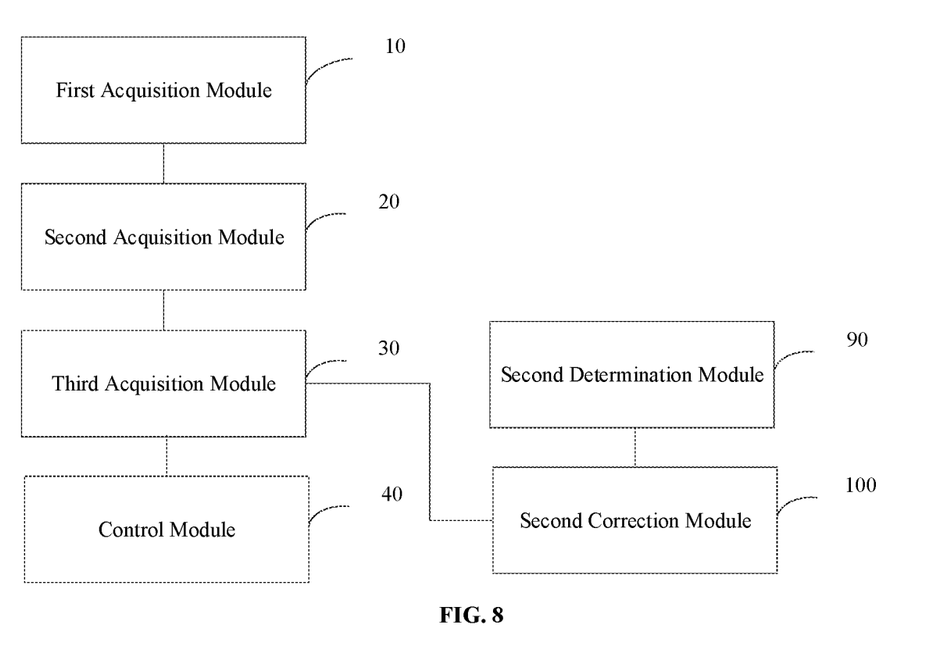
FIG. 8 is a block diagram of an apparatus for autonomously driving a vehicle according to yet another embodiment of the present disclosure.

In an embodiment of the present disclosure, as shown in FIG. 8 and on the basis of FIG. 6, the apparatus further includes: a second determination module 90 and a second correction module 100.

The second determination module 90 is configured to determine whether a yaw rate of the current vehicle is zero.

The second correction module 100 is configured to, in response to the yaw rate being not zero, correct the steering angle instruction based on the real-time motion curvature.

It should be noted that the explanation of the method for autonomously driving the vehicle according to the foregoing embodiment is also applicable to the apparatus for autonomously driving the vehicle according to the embodiment, and details will not be described herein again.

In summary, with the apparatus for autonomously driving the vehicle according to the embodiment of the present disclosure, autonomous driving control based on the spiral line may ensure motion sensing of autonomous driving. In addition, the spiral line corresponding to the driving of the current vehicle may be directly determined based on predetermined equations, that is, spiral lines at other speeds and curvature variations may be obtained directly with the reference spiral line, thereby effectively simplifying calculation logic of the spiral lines, shortening system computation period, improving the efficiency of the control algorithm, reducing the occupation of system resources, mitigating reliance on a high-performance platform, and lowering the costs of mass production, such that the control accuracy is guaranteed while the amount of computation is reduced.

To implement the above embodiments, the present disclosure further provides a computer device, including a processor and a storage device. The processor is configured to run, by reading an executable program code stored in the storage device, a program corresponding to the executable program code, so as to implement the method for autonomously driving the vehicle according to any of the above embodiments.

To implement the above embodiments, the present disclosure further provides a computer-readable storage medium having a computer program stored thereon. When the computer program is executed by a processor, the method for autonomously driving the vehicle according to any of the above embodiments is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for autonomously driving a vehicle, comprising:
recognizing a centerline of a lane on which a current vehicle is driving; acquiring a lateral distance between the current vehicle and the centerline of the lane, and a real-time speed and a real-time motion curvature of the current vehicle;
calculating the lateral distance, the real-time speed, and the real-time motion curvature, based on a preset first spiral line equation, to acquire parameters of a reference spiral line;
calculating the parameters, the real-time speed, and the real-time motion curvature, based on a preset second spiral line equation, to acquire a current spiral line; and
determining a steering angle instruction of a steering wheel of the current vehicle based on a first curvature of the current spiral line; and driving the current vehicle based on the steering angle instruction;
wherein the method further comprises:
acquiring an included angle between the current vehicle and the centerline of the lane;
acquiring a second curvature based on the included angle and the current spiral line; and
determining whether a difference between the first curvature and the second curvature is within a preset range; and in response to the difference being not within the preset range, correcting the first curvature based on a preset correction strategy.

2. The method of claim 1, further comprising:
determining whether a yaw rate of the current vehicle is zero; and
in response to the yaw rate being not zero, correcting the steering angle instruction based on the real-time motion curvature.

3. The method of claim 1, wherein the preset first spiral line equation is denoted by:

$$\Delta Y = Y_R \cdot \sqrt{\frac{V \cdot A\_Cur_R}{V_R \cdot A\_Cur}}$$

where $\Delta Y$ represents the lateral distance, V represents the real-time speed, A_Cur represents a curvature variation that is obtained by deriving the real-time motion curvature, and $V_R$, $Y_R$ and $A\_Cur_R$ represent parameters of the reference spiral line.

4. The method of claim 1, wherein the preset second spiral line equation is denoted by:

$$\text{Curvatrue} = Cur_R \cdot \sqrt{\frac{V_R \cdot A\_Cur}{V \cdot A\_Cur_R}}$$

where Curvatrue represents the current spiral line, $Cur_R$ represents a curvature of the reference spiral line, $A\_Cur_R$ represents a curvature variation that is obtained by deriving the curvature of the reference spiral line, $V_R$ represents a reference speed, V represents the real-time speed, and A_Cur represents a curvature variation that is obtained by deriving the real-time motion curvature.

5. A computer device, comprising a processor and a storage device; wherein, the processor is configured to run, by reading an executable program code stored in the storage device, a program corresponding to the executable program code, so as to implement the method for autonomously driving a vehicle, the method comprising:
recognizing a centerline of a lane on which a current vehicle is driving; acquiring a lateral distance between the current vehicle and the centerline of the lane, and a real-time speed and a real-time motion curvature of the current vehicle;
calculating the lateral distance, the real-time speed, and the real-time motion curvature, based on a preset first spiral line equation, to acquire parameters of a reference spiral line;

calculating the parameters, the real-time speed, and the real-time motion curvature, based on a preset second spiral line equation, to acquire a current spiral line; and determining a steering angle instruction of a steering wheel of the current vehicle based on a first curvature of the current spiral line; and driving the current vehicle based on the steering angle instruction;

wherein the method further comprises:

acquiring an included angle between the current vehicle and the centerline of the lane;

acquiring a second curvature based on the included angle and the current spiral line; determining whether a difference between the first curvature and the second curvature is within a preset range; and in response to the difference being not within the preset range, correcting the first curvature based on a preset correction strategy.

6. The device of claim 5, wherein the method further comprises: determining whether a yaw rate of the current vehicle is zero; and in response to the yaw rate being not zero, correcting the steering angle instruction based on the real-time motion curvature.

7. The device of claim 5, wherein the preset first spiral line equation is denoted by:

$$\Delta Y = Y_R \cdot \sqrt{\frac{V \cdot A\_Cur_R}{V_R \cdot A\_Cur}}$$

where $\Delta Y$ represents the lateral distance, V represents the real-time speed, A_Cur represents a curvature variation that is obtained by deriving the real-time motion curvature, and $V_R$, $Y_R$ and $A\_Cur_R$ represent parameters of the reference spiral line.

8. The device of claim 5, wherein the preset second spiral line equation is denoted by:

$$\text{Curvatrue} = Cur_R \cdot \sqrt{\frac{V_R \cdot A\_Cur}{V \cdot A\_Cur_R}}$$

where Curvatrue represents the current spiral line, $Cur_R$ represents a curvature of the reference spiral line, $A\_Cur_R$ represents a curvature variation that is obtained by deriving the curvature of the reference spiral line, $V_R$ represents a reference speed, V represents the real-time speed, and A_Cur represents a curvature variation that is obtained by deriving the real-time motion curvature.

9. A non-transient computer-readable storage medium having a computer program stored thereon, wherein when the computer program is executed by a processor, a method for autonomously driving a vehicle is implemented, the method comprising:

recognizing a centerline of a lane on which a current vehicle is driving; acquiring a lateral distance between the current vehicle and the centerline of the lane, and a real-time speed and a real-time motion curvature of the current vehicle;

calculating the lateral distance, the real-time speed, and the real-time motion curvature, based on a preset first spiral line equation, to acquire parameters of a reference spiral line;

calculating the parameters, the real-time speed, and the real-time motion curvature, based on a preset second spiral line equation, to acquire a current spiral line;

determining a steering angle instruction of a steering wheel of the current vehicle based on a first curvature of the current spiral line; and driving the current vehicle based on the steering angle instruction;

wherein the method further comprises:

acquiring an included angle between the current vehicle and the centerline of the lane;

acquiring a second curvature based on the included angle and the current spiral line; and determining whether a difference between the first curvature and the second curvature is within a preset range; and in response to the difference being not within the preset range, correcting the first curvature based on a preset correction strategy.

10. The non-transient computer-readable storage medium of claim 9, wherein the method further comprises:

determining whether a yaw rate of the current vehicle is zero; and in response to the yaw rate being not zero, correcting the steering angle instruction based on the real-time motion curvature.

11. The non-transient computer-readable storage medium of claim 9, wherein the preset first spiral line equation is denoted by:

$$\Delta Y = Y_R \cdot \sqrt{\frac{V \cdot A\_Cur_R}{V_R \cdot A\_Cur}}$$

where $\Delta Y$ represents the lateral distance, V represents the real-time speed, A_Cur represents a curvature variation that is obtained by deriving the real-time motion curvature, and $V_R$, $Y_R$ and $A\_Cur_R$ represent parameters of the reference spiral line.

12. The non-transient computer-readable storage medium of claim 9, wherein the preset second spiral line equation is denoted by:

$$\text{Curvatrue} = Cur_R \cdot \sqrt{\frac{V_R \cdot A\_Cur}{V \cdot A\_Cur_R}}$$

where Curvatrue represents the current spiral line, $Cur_R$ represents a curvature of the reference spiral line, $A\_Cur_R$ represents a curvature variation that is obtained by deriving the curvature of the reference spiral line, $V_R$ represents a reference speed, V represents the real-time speed, and A_Cur represents a curvature variation that is obtained by deriving the real-time motion curvature.

* * * * *